United States Patent
Zhang

(10) Patent No.: US 10,326,699 B2
(45) Date of Patent: Jun. 18, 2019

(54) LDP SWITCHOVER THRESHOLD TLV TO DENOTE LSP SWITCHOVER THRESHOLD

(71) Applicant: Telefonaktiebolaget LM Ericsson (publ), Stockholm (SE)

(72) Inventor: Zhen Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 225 days.

(21) Appl. No.: 15/301,741

(22) PCT Filed: Apr. 8, 2014

(86) PCT No.: PCT/CN2014/074894
§ 371 (c)(1),
(2) Date: Oct. 4, 2016

(87) PCT Pub. No.: WO2015/154219
PCT Pub. Date: Oct. 15, 2015

(65) Prior Publication Data
US 2017/0034061 A1    Feb. 2, 2017

(51) Int. Cl.
*H04L 12/803* (2013.01)
*H04L 12/64* (2006.01)
(Continued)

(52) U.S. Cl.
CPC ........ *H04L 47/125* (2013.01); *H04L 12/6418* (2013.01); *H04L 41/0816* (2013.01); *H04L 45/507* (2013.01); *H04L 47/2441* (2013.01)

(58) Field of Classification Search
None
See application file for complete search history.

(56) References Cited

U.S. PATENT DOCUMENTS 8,570,871 B2    10/2013  Yong et al.
9,178,810 B1 *  11/2015  Singh .................. H04L 45/50
(Continued)

FOREIGN PATENT DOCUMENTS

| CN | 1366402 A   | 8/2002  |
|----|-------------|---------|
| CN | 103416029   | 11/2013 |
| EP | 2658192 A1  | 10/2013 |

OTHER PUBLICATIONS

Kompella, K., et al. "The Use of Entropy Labels in MPLS Forwarding draft-ieff-mpls-entropy-label-06," Network Working Group, Internet-Draft, Updates: 3031, 3107, 3209, 5036, Standards Track, Sep. 6, 2012, pp. 1-24.

(Continued)

*Primary Examiner* — Gregory B Sefcheck
*Assistant Examiner* — Jenkey Van
(74) *Attorney, Agent, or Firm* — Coats & Bennett, PLLC

(57) ABSTRACT

The present disclosure generally relates to the field of label switching. More specifically, the present disclosure relates to techniques of providing, forwarding and distributing load balancing information in a label switched network. A method of providing load balancing information in a label switched network comprises the steps of: configuring (S402), by a first router (40) of the label switched network, load balancing information, the load balancing information indicating a condition under which load balancing is to be performed for a class of data packets comprising one or more data packets; and providing (S404), by the first router (40), the configured load balancing information together with label information, being related to the class of data packets, in one message to at least one second router (20) of the label switched network, in order to establish at least a section of a path for label switching the one or more data (Continued)

packets of the class of data packets through the label switched network on the basis of the label information.

16 Claims, 7 Drawing Sheets

(51) Int. Cl.
    *H04L 12/24*     (2006.01)
    *H04L 12/723*     (2013.01)
    *H04L 12/851*     (2013.01)

(56) References Cited

U.S. PATENT DOCUMENTS

| | | | |
|---|---|---|---|
| 9,923,798 B1 * | 3/2018 | Bahadur | H05K 999/99 |
| 2004/0156313 A1 | 8/2004 | Hofmeister et al. | |
| 2005/0094554 A1 * | 5/2005 | Nakash | H04L 12/437 370/222 |
| 2009/0163223 A1 * | 6/2009 | Casey | H04W 36/22 455/453 |
| 2015/0092593 A1 * | 4/2015 | Kompella | H04L 45/50 370/254 |

OTHER PUBLICATIONS

Jamoussi, B. (ed.), et al., "Constraint-Based LSP Setup using LDP," (draft-ueft-mpls-cr-ldp-06.txt), MPLS Working Group, Internet Draft, Nov. 1, 2001, pp. 1-34.

Bryant, S., et al., "Remote LFA FRR", Network Working Group Internet-Draft, Nov. 22, 2013, pp. 1-24, IETF.

Shand, M., et al., "IP Fast Reroute Framework", Internet Engineering Task Force (IETF) Request for Comments: 5714, Jan. 1, 2010, pp. 1-15, IETF.

Shand, M., et al., "A Framework for Loop-Free Convergence", Internet Engineering Task Force (IETF) Request for comments: 5715, Jan. 1, 2010, pp. 1-22, IETF.

Andersson, L., et al., "LDP Specification", Network Working Group Request for Comments: 5036, Oct. 1, 2007, pp. 1-135, IETF.

Atlas, A., et al., "Basic Specification for IP Fast Reroute: Loop-Free Alternates", Network Working Group, Request for Comments: 5286, Sep. 1, 2008, pp. 1-31, IETF.

Jamoussi, B. et al. "Constraint-Based LSP Setup using LDP", Network Working Group, Request for comments: 3212, Jan. 1, 2002, pp. 1-65, The Internet Society.

* cited by examiner

```
⊞ Label Mapping Message
   0... .... = U bit: unknown bit not set
   Message Type: Label Mapping Message (0x400)
   Message Length: 24
   Message ID: 0x00000008
 ⊞ Forwarding Equivalence Classes TLV
   00.. .... = TLV unknown bits: known TLV, do not forward (0x00)
   TLV Type: Forwarding Equivalence Classes TLV (0x100)
   TLV Length: 8
   ⊟ FEC Elements
     ⊟ FEC Element 1
        FEC Element Type: Prefix FEC (2)
        FEC Element Address Type: IPv4 (1)
        FEC Element Length: 32
        Prefix: 1.1.1.1
 ⊞ Generic Label TLV
   00.. .... = TLV unknown bits: known TLV, do not forward (0x00)
   TLV Type: Generic Label TLV (0x200)
   TLV Length: 4
   Generic Label: 655362
 ⊞ Switchover threshold TLV
```

Fig. 5

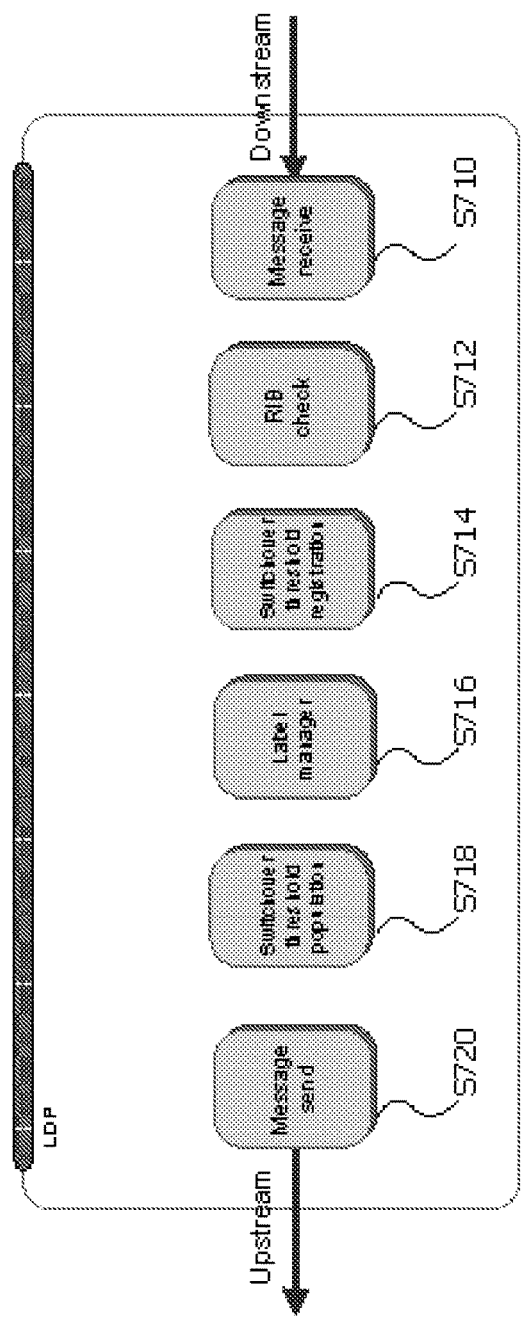

LDP SWITCHOVER THRESHOLD TLV TO DENOTE LSP SWITCHOVER THRESHOLD

TECHNICAL FIELD

The present disclosure generally relates to the field of label switching. More specifically, the present disclosure relates to techniques of providing, forwarding and distributing load balancing information in a label switched network.

BACKGROUND

In a mobile backhaul (MBH) portion of a communication network, a switchover threshold which triggers load balancing in a node of the MBH portion, e.g., a microwave ring network, is manually configured along a label switching path (LSP). In a communication network such as a telecommunication network, the backhaul portion of the network typically comprises the intermediate links between the core network, or backbone network, and the, particularly small, subnetworks at the edge of the entire network.

For example, the bandwidth of microwave links is not always fixed and is prone to fluctuate due to external conditions such as weather. Typically, higher modulation schemes that provide higher bandwidth are used under normal weather conditions, and lower modulation schemes are used under unfavorable conditions that affect wireless transmission such as rain, thereby resulting in reduced bandwidth. Efficient utilization of the whole available network bandwidth is one key issue in MBH, especially when using microwaves. In some failure scenarios where a particular transport path is degraded due to rain, low priority traffic could get rerouted through an alternate path to achieve better utilization of the network bandwidth and provide better experience to customer.

Internet Protocol (IP)/Multiprotocol Label Switching (MPLS) is being widely deployed in service provider networks extending all the way to the access domain. It is becoming a preferred packet transport technology in microwave networks as well. Based on above reasons, the load balancing to achieve the goal of efficient bandwidth utilization together with adaptive modulation can be based on MPLS forwarding or similar forwarding techniques.

In order to enable nodes of the network to make load balancing decisions, LSP switchover thresholds have to be configured manually on all the nodes of each LSP. On each node, a switchover threshold for all LSPs has to be set one by one independently of whether the node is a transit router or an ingress router of the LSP concerned. Considering the huge number of LSPs existing in the network, the complex configuration may result in rollout delays and extra costs. Further, the manual configuration is error-prone as the threshold for each LSP on all nodes has to be consistent. Still further, it is difficult to maintain the threshold when the threshold needs to be updated based on varying network situations.

In summary, the manual switchover threshold pre-configuration is costly, error-prone and has poor maintenance characteristics.

SUMMARY

Accordingly, there is a need for providing measures for providing load balancing information in a label switched network in an efficient, cost effective and easy way.

According to a first aspect, a method of providing load balancing information in a label switched network is provided. The method comprises the step of configuring, by a first router of the label switched network, load balancing information. The load balancing information indicates a condition under which load balancing is to be performed for a class of data packets comprising one or more data packets. The method may further comprise providing, by the first router, the configured load balancing information together with label information in one message to at least one second router of the label switched network. The label information is related to the class of data packets. The configured load balancing information is provided, by the first router, together with the label information in the one message to the at least one second router, in order to establish at least a section of a path for label switching the one or more data packets of the class of data packets through the label switched network on the basis of the label information.

According to a second aspect, a method of forwarding load balancing information in a label switched network is provided. The method comprises the step of receiving, by at least one second router of the label switched network, load balancing information. The load balancing information indicates a condition under which load balancing is to be performed for a class of data packets comprising one or more data packets. The load balancing information is received together with label information, being related to the class of data packets, in one message, in order to establish at least a section of a path for label switching the one or more data packets of the class of data packets through the label switched network on the basis of the label information. The load balancing information enables the at least one second router to determine whether the indicated condition is met. The method comprises forwarding, by the at least one second router, the received load balancing information together with label information in one message, in order to establish at least a further section of the path for label switching the one or more data packets of the class of data packets through the label switched network on the basis of the label information.

According to third aspect, a method of distributing load balancing information in a label switched network is provided. The method comprises the step of configuring, by a first router of the label switched network, load balancing information. The load balancing information indicates a condition under which load balancing is to be performed for a class of data packets comprising one or more data packets. The method further comprises the step of providing, by the first router, the configured load balancing information together with label information, being related to the class of data packets, in one message to at least one second router of the label switched network, in order to establish at least a section of a path for label switching the one or more data packets of the class of data packets through the label switched network on the basis of the label information. The method further comprises the step of receiving, by the at least one second router, the load balancing information. The load balancing information is received together with the label information, being related to the class of data packets, in one message. The load balancing information enables the at least one second router to determine whether the indicated condition is met. The method further comprises forwarding, by the at least one second router, the received load balancing information together with label information in one message, in order to establish at least a further section of a path for label switching the one or more data packets of the class of data packets through the label switched network on the basis of the label information.

According to a fourth aspect, a computer program is provided. The computer program comprises program code portions for performing the steps of any one of the method aspects described herein, when the computer program is run on one or more computing devices. The computer program may be stored on a computer readable recording medium.

According to a fifth aspect, a first router for providing load balancing information in a label switched network is provided. The first router comprises a configuring component and a providing component. The configuring component is adapted to configure load balancing information. The load balancing information indicates a condition under which load balancing is to be performed for a class of data packets comprising one or more data packets. The providing component is adapted to provide the configured load balancing information together with label information, being related to the class of data packets, in one message to at least one second router of the label switched network, in order to establish at least a section of a path for label switching the one or more data packets of the class of data packets through the label switched network on the basis of the label information.

According to a sixth aspect, a second router for forwarding load balancing information in a label switched network is provided. The second router comprises a receiving component and a forwarding component. The receiving component is adapted to receive load balancing information. The load balancing information indicates a condition under which load balancing is to be performed for a class of data packets comprising one or more data packets. The load balancing information is received together with label information, being related to the class of data packets, in one message, in order to establish at least a section of a path for label switching the one or more data packets of the class of data packets through the label switched network on the basis of the label information. The load balancing information enables the second router to determine whether the indicated condition is met. The forwarding component is adapted to forward the received load balancing information together with label information in one message, in order to establish at least a further section of a path for label switching the one or more data packets of the class of data packets through the label switched network on the basis of the label information.

According to a seventh aspect, a system of distributing load balancing information in a label switched network is provided. The system comprises a first router as described herein and at least one second router as described herein. The system may be configured to perform the steps of any one of the method aspects as described herein.

BRIEF DESCRIPTION OF THE DRAWINGS

In the following, the present disclosure will further be described with reference to exemplary embodiments illustrated in the figures, in which:

FIG. 5 schematically illustrates the structure of a label mapping message comprising a threshold value;

FIG. 7 is a flowchart illustrating further steps of the second method embodiment performed in one or more of the second routers of FIG. 3.

DETAILED DESCRIPTION

Figure 1:
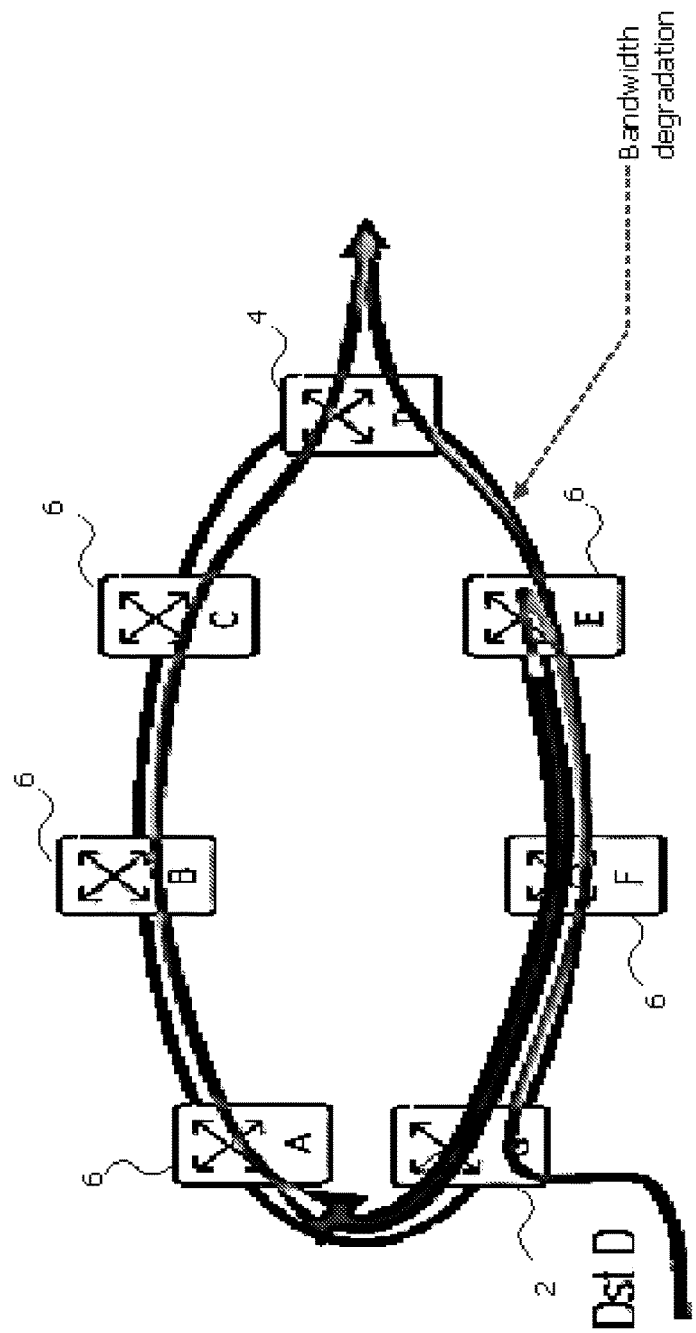
FIG. 1 is a schematic illustration of a load balancing operation in a ring network.

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, the skilled person will appreciate that the present disclosure may be practiced with implementations different from the specific Multiprotocol Label Switching (MPLS) discussed below with respect to FIGS. 1 to 7 and the specific MPLS terminology used below to illustrate the present disclosure. Also, although the present disclosure is partly described with reference to a ring network, the present disclosure may be practiced in other networks to which mobile or stationary users may attach. For example, the present disclosure is applicable to any mobile backhaul of cellular networks such as Global System for Mobile Communications (GSM), Universal Mobile Telecommunications System (UMTS), Long Term Evolution (LTE), LTE-advanced (LTE-a) networks, or to Wireless Local Area Network (WLAN) or similar wireless networks, but also of wireline networks such as, for example, the Intranet of a company with some or many separated subsidiaries or the Internet.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to perform the methods disclosed herein when executed by the processor.

In accordance with the first method aspect described above, a label switched network may be understood as a network in which label switching can be performed. Label switching may be regarded as a technique of network relaying. Each data packet may be assigned with label information, e.g., a label, and the switching may take place after examination of the label information, e.g., the label, assigned to each data packet. In a label switched network, packet-forwarding decisions may be made solely on the contents of the label information, e.g., the label, without the need to examine the packet itself. The label information, e.g., the label, may be considered to identify virtual links, hence paths, between distant nodes rather than endpoints.

The label switched network may comprise or be configured as a Multi-Protocol Label Switching (MPLS) domain of a communication network. Alternatively or additionally, the class of data packets may be, may be related to or may comprise a forwarding equivalence class (FEC). Alternatively or additionally, the path may be a label switched path (LSP). All of these terminologies will be explained in more detail below.

A path for label switching may be an LSP. Data packets may be forwarded along such LSP. An LSP may be understood as a path through a label switched network. An LSP may be set up by a signaling protocol such as Label Distribution Protocol (LDP), Resource Reservation Protocol-Traffic Engineering (RSVP-TE), Border Gateway Protocol (BGP) or Constraint-based Routing LDP (CR-LDP).

The at least one second router may be or comprise a transit router, which is also sometimes referred to as intermediate router, such as a label switch router (LSR). In this case, the at least one second router may perform routing based, particularly only, on the label information. A transit router such as an LSR may be regarded as a type of router located in the middle of the label switched network in the sense of between the edge routers of the label switched network. Such transit router, e.g., such LSR, may be responsible for switching the labels used to route packets. For example, when an LSR receives a data packet, the LSR may use the label information included in the data packet, e.g., the packet header, as an index to determine the next hop on the LSP and corresponding label information for the packet, e.g., from a lookup table. The old label information may then be removed from the data packet, e.g., the packet header, and be replaced with new label information before the data packet is routed forward.

The first router may be regarded as an edge router of the label switched network, particularly a Label Edge Router (LER) (also known as edge LSR). An edge router such as an LER may be understood as a router that operates at the edge of a label switched network and may act as the entry and exit points for the network. Edge routers such as LERs may respectively push label information onto an incoming packet and pop the label information off the outgoing packet. When forwarding datagrams into the domain of the label switched network, an LER may use routing information to determine appropriate label information, e.g., labels, to be affixed, may "label" the packet(s) accordingly, and may then forward the labelled packet(s) into the domain of the label switched network.

The router which first prefixes label information, e.g. a label, to a packet may be called an ingress router. The at least one second router may be or comprise an ingress router.

Likewise, upon receiving a labelled packet which is destined to exit the domain of the label switched network, an LER may strip off the label information, e.g., the label, and may forward a resulting packet, e.g., an IP packet, using normal forwarding rules, e.g., IP forwarding rules. Such last router in an LSP, which pops the label from the packet, may be called an egress router. The first router may be or comprise an egress router. Routers in-between the ingress router and the egress router, which need only to swap labels, may be called transit routers or LSRs.

An ingress router may thus be regarded as a transit router, e.g., an LSR that is a starting point, hence, a source, for a given path, e.g., LSP. An ingress router may be an egress router or a transit router for any other path, e.g., LSP(s). Hence the role of ingress and egress routers is path specific, e.g., LSP specific. Usually, label information may be attached with an IP packet at the ingress router and removed at the egress router, whereas label swapping is performed on the intermediate routers.

The path may be set up based on criteria in a class of data packets, e.g., in an FEC explained in more detail below. The path may extend between two or more LERs. The path may begin at an LER, which may make a decision on which label information, e.g., which label, to prefix to a data packet based on an appropriate class of data packets, e.g., an appropriate FEC as explained below. The LER may then forward the packet along the path to the next router in the path, which may swap the data packet's outer label for another label, and may then forward it to the next router. The last router in the path may remove the label from the data packet and may forward the data packet based on the header of its next layer, for example IPv4. In case of LSPs, due to the forwarding of data packets through an LSP being opaque to higher network layers, an LSP is sometimes referred to as a label switched tunnel, e.g., an MPLS tunnel. LSPs may be unidirectional. The LSPs may enable a packet to be label switched through the label switched network from one endpoint to another. LSPs may be established by the network operator for a variety of purposes, such as to create network-based IP virtual private networks or to route traffic along specified paths through the network.

Label information, e.g., labels, may be distributed between LERs and LSRs using various protocols such as the Label Distribution Protocol (LDP). LSRs in a label switched network may regularly exchange label and reachability information with each other using standardized procedures in order to build a complete picture of the network they can then use to forward packets.

The class of data packets may be a set of data packets with similar and/or identical characteristics which may be forwarded in the same manner, e.g., in the same way through the label switched network. For example, the class of data packets may be, may be related to or may comprise a Forwarding Equivalence Class (FEC). An FEC may be a group of LSPs, with similar or identical priority, or Class of Service (CoS). Since the traffic groups are all of the same or at least similar CoS, they may be forwarded with the same class of priority. FECs may be a set of packets which will be forwarded in the same manner (e.g., over the same path with the same forwarding treatment). Typically packets belonging to the same FEC will follow the same path in the domain of the label switched network. While assigning a packet to an FEC, the ingress LSR may look at the IP header and also some other information such as the interface on which this packet arrived. The FEC to which a packet is assigned may be identified by a label.

Each router may have a class cross-reference table, e.g., an FEC cross-reference table, that stores information for each path, e.g., each LSP. This table may include the ingress port and label, the egress port and label, and the path's priority, e.g., the LSP's priority or CoS. An FEC may be associated with each LSP created. The FEC may specify which packets are mapped to that LSP, and the destination IP address prefix. As a packet traverses the network the intermediate router may simply swap labels and forward the packet based on the FEC, without ever examining the contents of the packet. Thus all packets which belong to the same FEC may get treated in the same way and quickly are sped along their way.

Thus, a Forward Equivalence Class tends to correspond to an LSP. The reverse is not always true, since an LSP may be and, in particular, usually is, used for multiple FECs.

The step of providing according to the method of the first aspect may comprise sending a label mapping message to the at least one second router. The label mapping message may comprise the label information and the load balancing information. The label mapping message may be an LDP label mapping message. Other protocols may be used for distribution of the label mapping message.

The method may comprise incorporating the load balancing information into the label mapping message. The step of incorporating the load balancing information into the label mapping message may be performed by the first router.

The load balancing information may comprise a threshold value. For example, load balancing is to be performed for the class of data packets, if a currently available link bandwidth value divided by a maximum link bandwidth value is below the threshold value. The maximum link bandwidth value may be a value reflecting or representing the bandwidth of the at least one second router for this link under ideal, or in other words perfect, conditions. The currently available link bandwidth value may be a value reflecting or representing the bandwidth of the at least one second router for this link under current conditions. The currently available link bandwidth value may correspond to or may be smaller than the maximum link bandwidth value. The link may be understood as a physical link or a logical link.

The load balancing information may comprise at least one of a maximum link bandwidth value of the first router and an available link bandwidth value of the first router. The method may comprise comparing, e.g. by the at least one second router, the maximum link bandwidth value of the first router with the maximum link bandwidth value of the at least one second router. If the maximum link bandwidth value of the at least one second router does not match the maximum link bandwidth value of the first router, it may be upon a local policy of the at least one second router to make a decision whether load balancing is to be performed based on the threshold value or based on the maximum link bandwidth value of the first router. Further, the load balancing information may comprise an available link bandwidth value of the first router. The maximum link bandwidth value of the first router may be a value reflecting or representing a maximum bandwidth of a link of the first router. The available link bandwidth value of the first router may be a value reflecting or representing a bandwidth of a link of the first router which was actually available when determining the available link bandwidth value. If the local policy of the at least one second router makes the decision that load balancing is to be performed based on the maximum link bandwidth value of the first router, the at least one second router may compare the ratio of the maximum link bandwidth value of the first router and the available link bandwidth value of the first router (in the following referred to as first ratio) with the ratio of the maximum link bandwidth value of the at least one second router and the currently available link bandwidth value of the at least one second router (in the following referred to as second ratio). If the first ratio is higher than the second ratio, it may be determined that load balancing is to be performed by the at least one second router.

The method may comprise the step of configuring, by the first router, a set of load balancing information. Each of the set of load balancing information may indicate a condition under which load balancing is to be performed for a corresponding class of data packets. The method may comprise the step of providing, by the first router, each of the configured set of load balancing information together with label information, being related to the corresponding class of data packets, respectively in one message to a plurality of second routers, in order to establish, for each class of data packets, at least a section of a path for label switching the one or more data packets of the corresponding class of data packets through the label switched network on the basis of the label information. For example, first load balancing information may be provided together with first label information in one message to one of the one or more second routers. Further, second load balancing information may be provided together with second label information in the same one message to the one of the one or more second routers and so on. For another router of the one or more routers a further single message may be provided in a similar manner.

With respect to the method according to the second aspect, the load balancing information may comprise a threshold value. The method may further comprise determining that load balancing is to be performed for the class of data packets if a ratio determined by dividing a currently available link bandwidth value of the at least one second router by a maximum link bandwidth value of the at least one second router is below the threshold value.

The load balancing information may comprise at least one of a maximum link bandwidth value of the first router and an available link bandwidth value of the first router. The method may comprise comparing the maximum link bandwidth value of the first router with a maximum link bandwidth value of the at least one second router. If the maximum link bandwidth value of the at least one second router does not match the maximum link bandwidth value of the first router, it may be upon a local policy of the at least one second router to make a decision whether load balancing is to be performed based on the threshold value or based on the maximum link bandwidth value of the first router.

The load balancing information may be included in a type length value (TLV) element. The label switched network may be configured in a ring topology.

When a second router receives the load balancing information and the label information in one message, the received message may be terminated in the second router. The second router may send out a new message to another second router. The new message may comprise the same load balancing information. Further, the new message may comprise the same label information or new label information. The new label information may be generated or determined based on the received label information.

With respect to the first router according to the fifth aspect, the first router may be configured to perform any one of the method steps described above. The first router may be configured as or may comprise an egress router of the one or more data packets to be transmitted along the path.

With respect to the second router according to the sixth aspect, the second router may be configured to perform any one of the method steps described above. The second router may be configured as or may comprise an ingress router for the one or more data packets to be transmitted along the path or an intermediate router between the ingress router and an egress router for the one or more data packets to be transmitted along the path.

In general, the steps of any one of the method aspects described herein may equally be embodied in one or more suitable components, devices or units, e.g. in suitable components of the first router and/or the at least one second router.

FIG. 1 schematically illustrates by way of example an MPLS domain of a backhaul network of a communication network. According to the exemplary configuration of FIG. 1, the MPLS domain of the backhaul network is arranged in a ring topology as a ring network.

Data packets enter the MPLS domain on node G, which is an ingress router 2 of the MPLS domain. The destination of the data packets is behind an egress router 4 of the MPLS domain, namely node D. The shortest path between the ingress router 2, here node G, and the egress router 4, here node D, is a path via node F and node E, which are transit routers embodied as label switch routers (LSRs) 6 of the MPLS domain. At the egress router 4, here node D, the data packets are finally to leave the MPLS domain of the backhaul network.

If, for example, it is assumed that the bandwidth deteriorates on a link between node E and node D, hence the egress router 4, not all data packets may be forwarded on the link but may be rerouted. For example, depending on the amount of bandwidth available on the link and a local configuration table in node E, for a first subset of data packets destined to one or more destination FECs behind node D, load balancing may be performed, e.g., the data packets of the first subset, may be rerouted. The rerouting may take place via a remote loop free alternative (LFA). In this case, node E routes the traffic of the first subset via its remote LFA, i.e. node A, which is also an LSR 6 of the MPLS domain. For the traffic concerned, specifically the data packets of the first subset, node E changes the labels by replacing the previous label with an inner label and a tunnel label and tunnels the packets to node A. The tunnel label is terminated on node A and the inner label keeps the data packets of the first subset moving to node D, hence the egress router 4. A second subset of the data packets destined to other destination FECs behind node D, hence the egress router 4 and which are not subject to load balancing, is forwarded on the original path including the link from node E to node D.

In this way, only a portion of the total traffic, namely the second subset of data packets, is routed over the originally intended path which comprises a section, i.e., the link between node E and node D, that has been degraded. The rest of the traffic, namely the first subset of data packets, is rerouted over a different path which does not comprise the degraded section, here a degraded link between node E and node D. In this way, it is ensured that the traffic routed over the degraded link does not exceed the capacity of the degraded link.

In the above example, the granularity of load balancing is per FEC, i.e. per destination IP address. Per FEC load balancing means that the data packets belonging to FECs to be rerouted via a remote LFA at the given bandwidth level are stored in a local configuration table of a node (in the example above, in node E). For example, switchover thresholds may be stored in such configuration table. In the downstream direction, per FEC load balancing provides the granularity of per cell site, if MPLS is deployed down to the cell site. In this respect, the downstream direction is defined with respect to the traffic flow direction of the data packets from the ingress router to the egress router.

Selection of one or more FECs, for which load balancing is to be performed, e.g., by rerouting, is done through configuration on each node. The configuration defines a tiered structure to select an increased number of FECs as the link degradation worsens and lower levels of modulation are used. A simple example of such configuration is shown in the figure below.

| Available bandwidth ratio equaling switchover threshold | FEC | Notes |
|---|---|---|
| 100% | No Load balancing | If the ratio is between 75% to 100%, no action performed. |
| 75% | 10.10.1.0/24 to 10.10.9.0/24 | Ratio is higher than 75%, no LSP is switching. Once the ratio reaches 75% or even lower, all LSPs associated with the indicated FECs are switching. |
| 50% | 20.20.1.0/24 to 20.20.9.0/24 | Once the ratio reaches 50% or even lower, all LSPs associated with the indicated FECs are switching additionally. |
| 25% | 30.30.1.0/24 to 30.30.9.0/24 | Once the ratio reaches 25% or even lower, all LSPs associated with the indicated FECs are switching additionally. |

Since the LSP is distributed per FEC in LDP, it can be understood that load balancing is per LSP. The switchover thresholds as mentioned above have to be configured manually on all the nodes of each LSP. On each node, the switchover threshold for all LSPs has to be set one by one independently of whether the node is a transit router (e.g. LSR 6) or the ingress router 4 of the LSP. Considering the huge number of LSPs existing in a network, the following problems may occur with a manual configuration: (1) rollout delay and extra cost caused by the complex configuration; (2) The configuration is error-prone since it has to be guaranteed that the threshold for each LSP on all nodes is consistent; and (3) it is difficult to maintain the threshold when the threshold needs to be updated based on changing network situations.

In the following, it will be explained how the switchover threshold can be distributed automatically on the whole MPLS forwarding path, instead of using a manual configuration node-by-node-wise.

Figure 2:
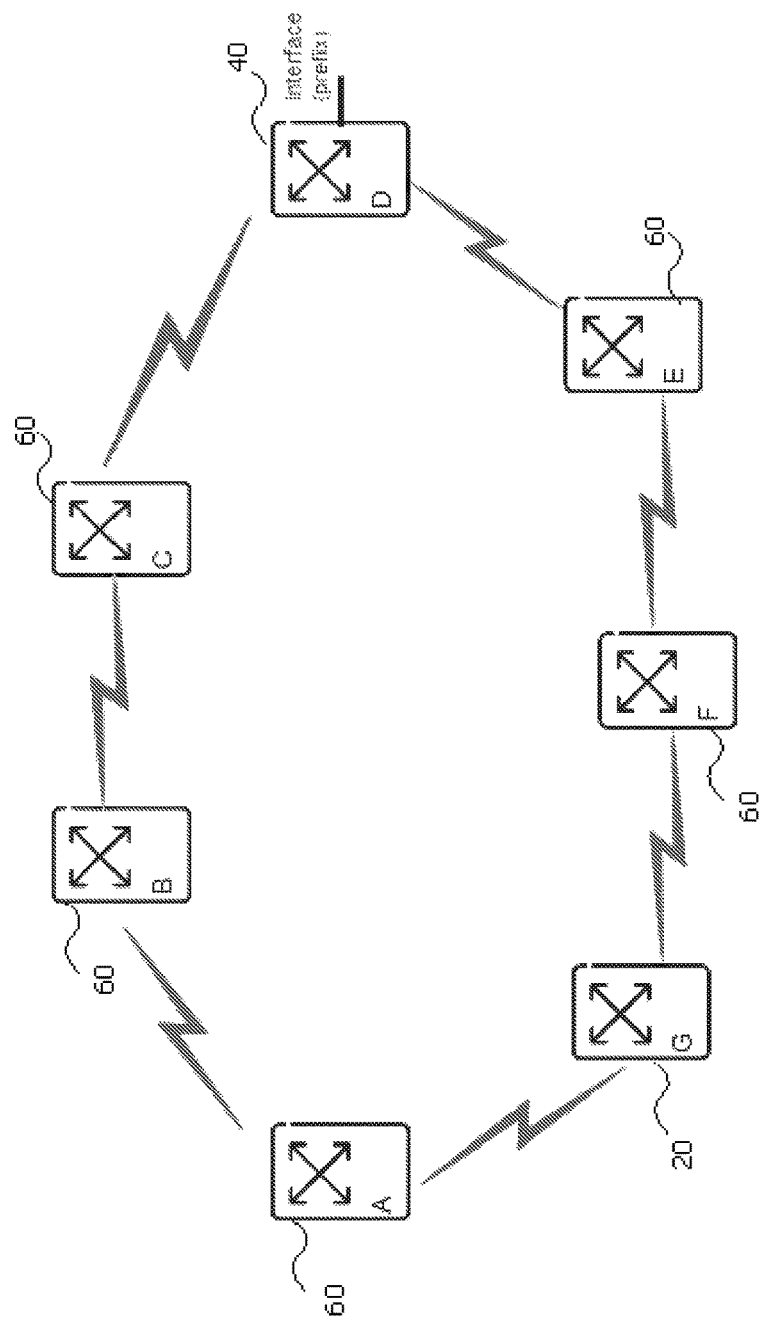
FIG. 2 is a schematic illustration of a ring network comprising a first router according to a device embodiment and multiple second routers according to a device embodiment.

FIG. 2 schematically illustrates by way of example an MPLS domain of a backhaul network of a communication network. In the illustrated MPLS domain, the LSP switchover threshold(s) is(are) configured automatically. The MPLS domain of the backhaul network is arranged in a ring topology. The MPLS domain comprises an ingress router 20 through which data packets can enter the MPLS domain, an egress router 40, through which the data packets can leave the MPLS domain, and five LSRs 60 between the ingress router 20 and the egress router 40. It is assumed in the following for sake of explanation rather than limitation that microwave links are respectively provided between neighboring nodes. The microwave links will in the following just be referred to as links, as other types of links are also conceivable.

Figure 3:
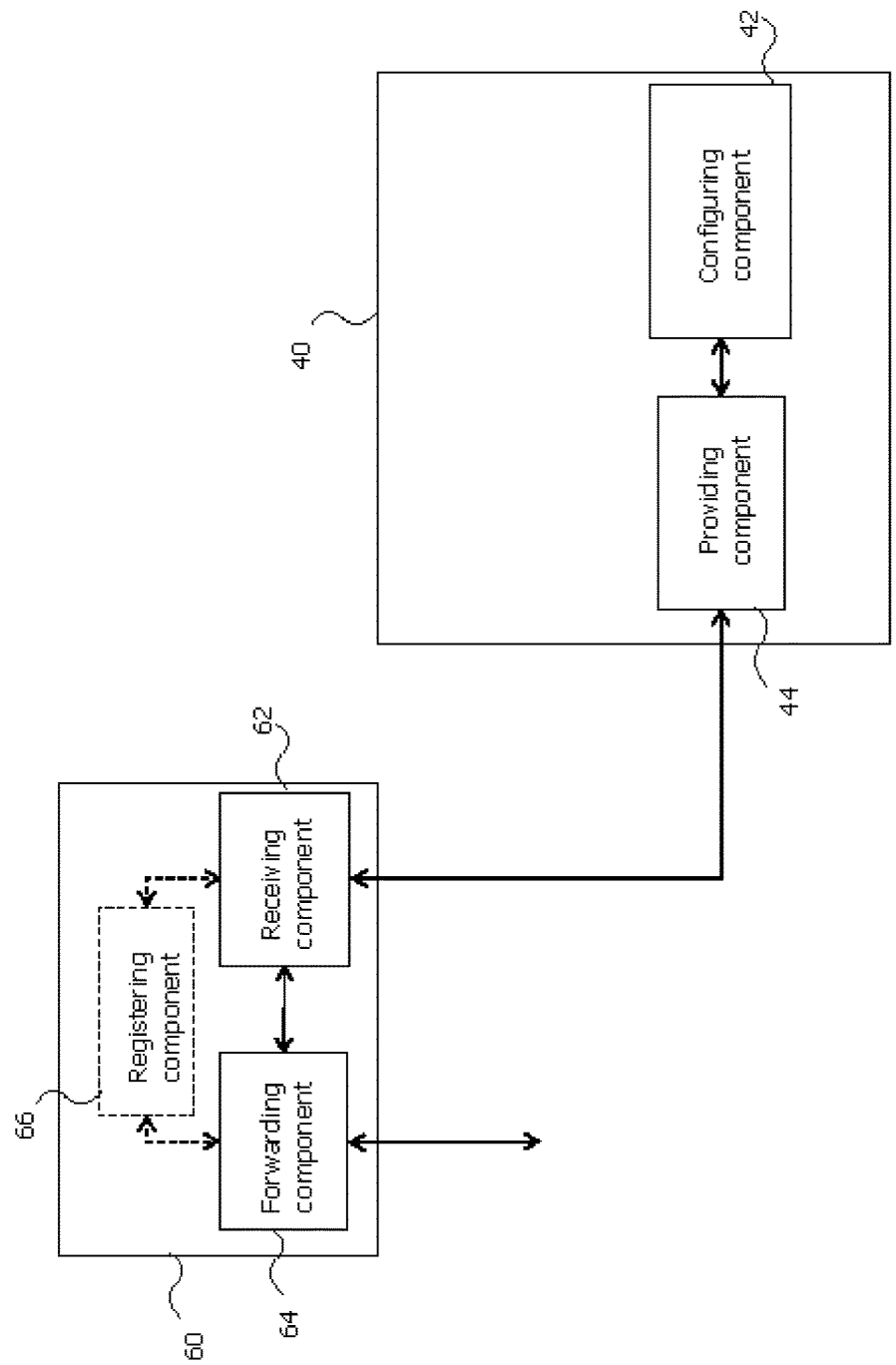
FIG. 3 is a schematic illustration of device embodiments of the first and second routers used in the network of FIG. 2.
Figure 4B:
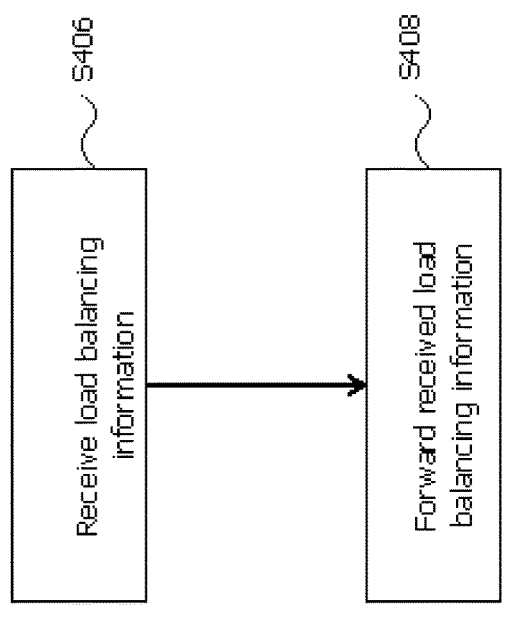
FIG. 4b is a flowchart illustrating a second method embodiment performed in one or more of the second routers of FIG. 3.
Figure 4A:
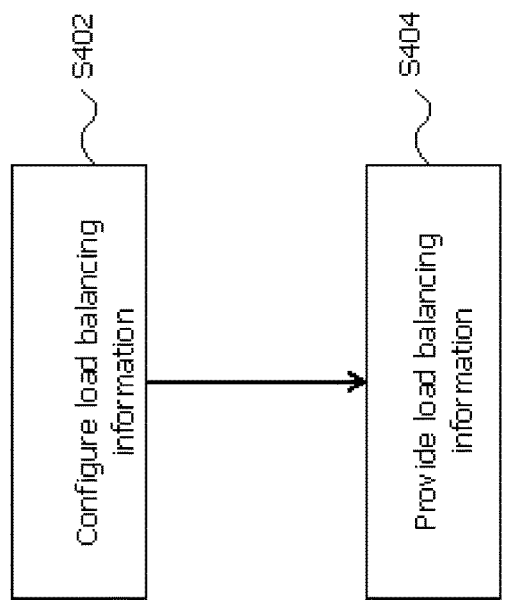
FIG. 4a is a flowchart illustrating a first method embodiment performed in the first router of FIG. 3.

In FIG. 3, details regarding the egress router 40 and one of the LSRs 60 are schematically shown. The egress router 40 comprises a configuring component 42 and a providing component 44. The shown LSR 60 comprises a receiving component 62 and a forwarding component 64. Further, the LSR 60 may comprise a registering component 66. All of the LSRs shown in FIG. 2 may have the structure of the LSR 60 shown in FIG. 3.

Method embodiments performed in the egress router 40 and the LSR 60, respectively, are now explained with respect to FIGS. 4a, 4b, 5 and 6. In accordance therewith, the switchover threshold can be automatically configured along a label path in an efficient, cost effective and easy way. The egress router 40 and an upstream direction are defined with respect to a traffic flow entering and leaving the ring network.

In step S402, the configuring component 42 of the egress router 40 configures a switchover threshold value as load balancing information. In more detail, the switchover threshold value is firstly pre-configured in the configuring component 42 of the egress or edge router 40 per each FEC. This may be done by including the switchover threshold value in a Label Distribution Protocol (LDP) label mapping message sent from the egress edge router 40 in an upstream direction. The LDP label mapping message is normally distributed by the egress router 40 throughout the MPLS domain. The LDP label mapping message is normally used to advertise a binding of a label to an FEC.

Figure 6:
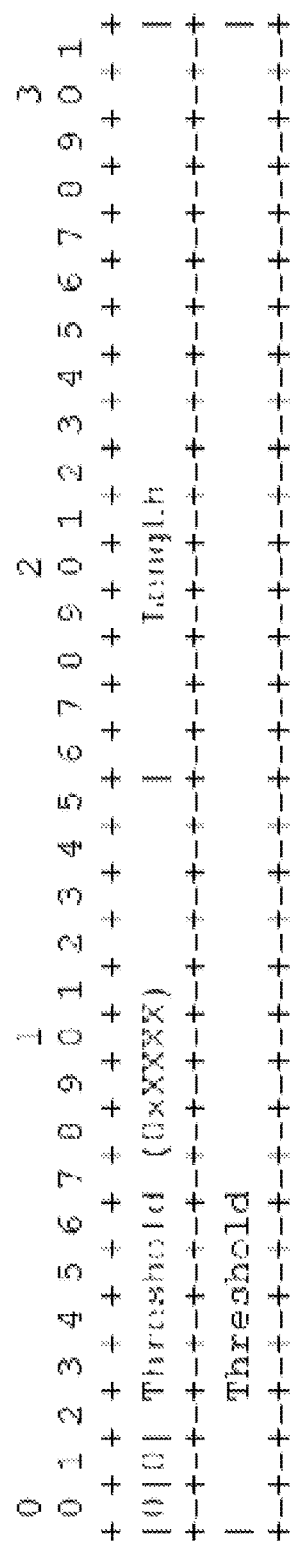
FIG. 6 schematically illustrates the format of a threshold value provided in the label mapping message of FIG. 5.

In order to distribute the switchover threshold value in the LDP label mapping message, a modified LDP label mapping message is proposed, which is schematically illustrated in FIGS. 5 and 6, by way of example. For distribution of the modified LDP label mapping message, the egress router 40, more specifically the providing component 44 of the egress router 40, provides the modified LDP label massage to its neighboring LSRs 60 in upstream direction (step S404). The neighboring LSRs 60 receive the modified LDP label mapping message in step S406 and use the switchover threshold value of the received modified LDP label mapping message to pre-configure their switchover threshold value. Then, the LSRs 60 generate a new modified LDP label mapping message including the switchover threshold value and forward the generated modified LDP label mapping message further upstream (step S408).

In short, each router on the label path receiving a modified LDP label mapping message terminates this message, uses the switchover threshold value of the received modified LDP label mapping message to pre-configure the switchover threshold value in the router, generates a new modified LDP label mapping message including the switchover threshold value, and forwards the generated modified LDP label mapping message further upstream. Therefore all nodes along the ring network are pre-configured with the same switchover threshold value. In the microwave ring shown in FIG. 2, if the interface on node D is the destination of the LSP implying that node D is the egress router 40 of this LSP, the prefix under the interface of node D may be distributed to the whole ring together with a corresponding forwarding label and switchover threshold hop by hop. In consequence, the switchover threshold value is same in each node of the whole ring. By providing a switchover threshold value for each label path, e.g., each LSP, traffic load balancing in ring network, e.g., a microwave ring, can be triggered when the bandwidth of the link, e.g., the microwave link, is degraded below a predefined threshold, i.e., below the switchover threshold value.

To give an example, it is assumed that the maximum link bandwidth or in other words a maximum link data rate or a maximum link capacity, between node F, hence, an upstream router, and node E, hence a downstream router, is 500 Mbps. Also assuming that node F has received an LDP label mapping message with a switchover threshold value of 80%. Further assuming that the link between node F and node E is degraded, e.g., because of bad weather conditions to 300 Mbps. In this case, it is decided by node F that load balancing is to be performed as the ratio between the currently available bandwidth value and the maximum link bandwidth value is 60% which is below the switchover threshold value.

A possible structure of the modified LDP label mapping message is shown in FIG. 5. The LDP label mapping message exemplarily comprises three type-length-values (TLVs), namely an FEC TLC, a Generic Label TLV and a switchover threshold TLV. In this respect, a TLV is also known as tag-length value. The switchover threshold value is uniquely defined per each FEC in the switchover threshold TLV. Therefore load balancing can be triggered along the label path for similar kind of link deterioration.

As set forth above, the modified LDP label mapping message includes a new TLV for the switchover threshold. Thus, in the present example, the load balancing information is carried by the switchover threshold TLV. The switchover threshold TLV includes the switchover threshold value. The switchover threshold value may be given in percentage with decimal number, e.g., 75%. By including the switchover threshold value in the LDP label mapping message, the LDP protocol is extended with the switchover threshold TLV. Further, the switchover threshold TLV is bound into the label mapping message of LDP, in order to distribute the LSP switchover threshold from end to end by LDP automatically with a simple configuration.

As set forth above, the LSP may be distributed per prefix FEC in LDP from end to end. As the prefix FEC TLV is incorporated in the modified LDP label mapping message together as well, there is a mapping between prefix FEC TLV and switchover threshold TLV with a 1:1 relationship. As the LDP label mapping message is originated on egress router 40 of each LSP and then is populated hop by hop until the ingress router 20 is reached, the switchover threshold has to be configured only for each prefix FEC on the egress router 40 of each LSP since the LSP is distributed per prefix FEC in LDP.

In addition to the switchover threshold, the new switchover threshold TLV may include at least one of a maximum link bandwidth value of the egress router 40 (e.g., given in orders of bits per second (bps)) and an available link bandwidth value of the egress router 40 (e.g., given in orders of bps). The maximum link bandwidth value may also be referred to as maximum link data rate value (as often, the data rate is given in bps) or maximum link capacity value. Likewise, the available link bandwidth value may also be referred to as available link data rate value (as often, the data rate is given in bps) or available link capacity value. Thus, the unit of both link bandwidth values may be given in bps, e.g., in Mbps, and the format of both may be a decimal number.

As explained above, normally, if the currently available bandwidth value divided by the maximum link bandwidth value is below the switchover threshold value, load balancing can be triggered.

If, however, the optional information, e.g., maximum link bandwidth value and/or available link bandwidth value, is included in the modified LDP label mapping message, load balancing can be triggered based on said optional information. For example, the maximum link bandwidth value of an LSR 60 may be compared with the maximum link bandwidth value as included in the modified LDP label mapping message, i.e., as provided by the egress router 40. If the maximum link bandwidth value of the LSR 60 matches the maximum link bandwidth value included in the modified LDP label mapping message, the LSR 60 may use the switchover threshold value anyway, in order to determine whether load balancing is to be performed. If, however, the maximum link bandwidth value of the LSR 60 does not match the maximum link bandwidth value included in the modified LDP label mapping message, a local policy of the LSR 60 may decide which criteria to use, in order to determine that load balancing is to be performed. According to a first option, the local policy may decide to use the switchover threshold value anyway, in order to determine whether load balancing is to be performed. According to a second option, the optional information included in the modified LDP label mapping message may be compared with the respective information of the LSR 60. For example, a ratio of the available link bandwidth value of the LSR 60 and the maximum link bandwidth value of the LSR 60 (first ratio) may be compared with the ratio of the available link bandwidth value included in the modified LDP label mapping message and the maximum link bandwidth value included in the modified LDP label mapping message (second ratio). If the first ratio is smaller than the second ratio, the LSR 60 may determine that load balancing is to be performed. Otherwise, the LSR 60 may determine that no load balancing is to be performed.

FIG. 6, shows an exemplary format of the switchover threshold TLV. As shown in FIG. 6, both the U bit and F bit are proposed as zero. According to the statement in chapter 3.4 of RFC 5036 (October 2007), upon receipt of an unknown TLV, if U is clear (=0), a notification MUST be returned to the message originator and the entire message MUST be ignored. With respect to the F bit, this bit applies only when the U-bit is set and the LDP message containing the unknown TLV is to be forwarded. If F is clear (=0), the unknown TLV is not forwarded with the containing message; if F is set (=1), the unknown TLV is forwarded with the containing message. Thus, in accordance with RFC 5036 (October 2007), the U bit and the F bit in the modified LDP label mapping message have to be correctly set, namely to zero, in order to enable legacy protocol operation. Therefore a LDP label mapping message is terminated at an the respective receiving router and a new LDP label mapping message is generated and sent in an upstream direction to a next hop router.

Further, in the example of FIG. 6, the type value of the switchover threshold is to be in the range of 0x3E00-0x3EFF, in order to allow the switchover threshold to be individually set. According to the statement in chapter 4.2 of RFC 5036 (October 2007), TLV types in the range of 0x3E00-0x3EFF are reserved for Vendor-Private extensions and are the responsibility of the individual vendors (see Section "LDP Vendor-Private TLVs"). Internet Assigned Numbers Authority (IANA) management of this range of the TLV Type Name Space is unnecessary.

The present disclosure is applicable to a ring topology as explained above but is not limited thereto. For example, with respect to RFC 5036 (October 2007), the present disclosure is applicable to Downstream Unsolicited Label Advertisement particularly where an upstream router receives a label mapping message from a downstream router without a request thereof, and ORDERED Label Distribution Control particularly where an upstream router has to wait for a receipt of a label mapping message from a downstream router before sending a label mapping message upstream.

The schematic flowchart of FIG. 7 explains further details in addition to the explanations above from the perspective of an LSR 60. According to the LDP process with automatic switchover threshold distribution as shown in FIG. 7, at first, in a step S710, an LDP label mapping message is received from downstream direction by an LSR 60. The Routing Information Base (RIB) checks the LDP label mapping message to validate the prefix in a step S712. Then, switchover threshold registration is performed in a step S714 by registering the switchover threshold value received in the modified LDP label mapping message in the registering component 66. Then, in a step S716, a label manager installs the label received in the modified LDP label mapping message. The switchover threshold value is then popped onto a new modified LDP label mapping message in a step S718. Finally, the new modified LDP label mapping message is send further upstream, e.g., to another LSR 60 particularly where the same or a similar process as explained in the foregoing is performed, or to the ingress router 20 in a step S720.

The configuration proposed by the present disclosure is very simple. There is no need to configure the switchover threshold for each LSP node by node. Rather, the switchover threshold is configured with LDP enabled on the egress router 40 of each LSP. The configuration is very fast and cost efficient. This is because efforts on configuration are reduced and rollout can be very fast. Shortening time usually results in cost reduction. Still further, the proposed configuration is easy to maintain and debug in the network. Once an uncertain issue related to load balancing is identified in the network, only the configuration on the egress router 40 of each LSP has to be checked instead of checking the configuration node by node. Finally, it is possible to quickly modify the configuration from end to end. When a network situation changes, the switchover threshold for each LSP from end to end can be easily adjusted by LDP extension.

The invention claimed is:

1. A method of providing load balancing information in a label switched network, the method comprising:
   configuring, by a first router of the label switched network, load balancing information comprising a maximum link bandwidth value of the first router and a threshold value, the load balancing information indicating a condition under which load balancing is to be performed for a class of data packets comprising one or more data packets;
   providing, by the first router, the configured load balancing information together with label information, being related to the class of data packets, in one message to at least one second router of the label switched network, in order to establish at least a section of a path for label switching the one or more data packets of the class of data packets through the label switched network based on the label information; and
   responsive to the maximum link bandwidth value of the first router not matching a maximum link bandwidth value of the at least one second router, deferring to a decision of the at least one second router, based on a local policy of the at least one second router, as to whether load balancing is to be performed based on the threshold value or based on the maximum link bandwidth value of the first router;
   wherein the load balancing is to be performed for the class of data packets if a currently available link bandwidth value divided by a maximum link bandwidth value is below the threshold value.

2. The method of claim 1, wherein the providing comprises sending a label mapping message to the at least one second router, the label mapping message comprising the label information and the load balancing information.

3. The method of claim 2, further comprising incorporating the load balancing information into the label mapping message.

4. The method of claim 1, further comprising:
   configuring, by the first router, a set of load balancing information, each of the set of load balancing information indicating a condition under which load balancing is to be performed for a corresponding class of data packets; and providing, by the first router, each of the configured set of load balancing information together with label information, being related to the corresponding class of data packets, respectively in one message to a plurality of second routers, in order to establish, for each class of data packets, at least a section of a path for label switching the one or more data packets of the corresponding class of data packets through the label switched network based on the label information.

5. The method of claim 1, wherein the load balancing information is included in a type length value (TLV) element.

6. The method of claim 1, wherein the label switched network is configured in a ring topology.

7. The method of claim 1, wherein at least one of the following is true:
the label switched network comprises or is configured as a Multi-Protocol Label Switching (MPLS) domain of a communication network;
the class of data packets is related to or comprises a forwarding equivalence class (FEC);
wherein the path is a label switched path (LSP).

8. A method of forwarding load balancing information in a label switched network, the method comprising:
receiving, by at least one second router of the label switched network, load balancing information comprising a maximum link bandwidth value of the first router and a threshold value, the load balancing information indicating a condition under which load balancing is to be performed for a class of data packets comprising one or more data packets; wherein the load balancing information is received together with label information, being related to the class of data packets, in one message, in order to establish at least a section of a path for label switching the one or more data packets of the class of data packets through the label switched network based on the label information, the load balancing information enabling the at least one second router to determine whether the indicated condition is met;
forwarding, by the at least one second router, the received load balancing information together with label information in one message, in order to establish at least a further section of the path for label switching the one or more data packets of the class of data packets through the label switched network based on the label information;
responsive to the maximum link bandwidth value of the first router not matching a maximum link bandwidth value of the at least one second router, deciding based on a local policy of the at least one second router whether to perform load balancing based on the threshold value or based on the maximum link bandwidth value of the first router; and
determining that load balancing is to be performed for the class of data packets if a currently available link bandwidth value divided by a maximum link bandwidth value is below the threshold value.

9. A method of distributing load balancing information in a label switched network, the method comprising:
configuring, by a first router of the label switched network, load balancing information comprising a maximum link bandwidth value of the first router and a threshold value, the load balancing information indicating a condition under which load balancing is to be performed for a class of data packets comprising one or more data packets;
providing, by the first router, the configured load balancing information together with label information, being related to the class of data packets, in one message to at least one second router of the label switched network, in order to establish at least a section of a path for label switching the one or more data packets of the class of data packets through the label switched network based on the label information;
receiving, by the at least one second router, the load balancing information, wherein the load balancing information is received in one message together with the label information, being related to the class of data packets, the load balancing information enabling the at least one second router to determine whether the indicated condition is met;
responsive to the maximum link bandwidth value of the first router not matching a maximum link bandwidth value of the at least one second router:
deciding, by the second router and based on a local policy of the at least one second router whether to perform load balancing based on the threshold value or based on the maximum link bandwidth value of the first router;
deferring, by the first router, to the decision of the at least one second router as to whether load balancing is to be performed based on the threshold value or based on the maximum link bandwidth value of the first router; and
determining, by the second router, that load balancing is to be performed for the class of data packets if a currently available link bandwidth value divided by a maximum link bandwidth value is below the threshold value; and
forwarding, by the at least one second router, the received load balancing information together with label information in one message, in order to establish at least a further section of a path for label switching the one or more data packets of the class of data packets through the label switched network based on the label information.

10. A non-transitory computer readable medium storing a computer program product for providing load balancing information in a label switched network, the computer program product comprising software instructions which, when run on one or more processing circuits of a first router of the label switched network, causes the first router to:
configure load balancing information comprising a maximum link bandwidth value of the first router and a threshold value, the load balancing information indicating a condition under which load balancing is to be performed for a class of data packets comprising one or more data packets;
provide the configured load balancing information together with label information, being related to the class of data packets, in one message to at least one second router of the label switched network, in order to establish at least a section of a path for label switching the one or more data packets of the class of data packets through the label switched network based on the label information; and
responsive to the maximum link bandwidth value of the first router not matching a maximum link bandwidth value of the at least one second router, defer to a decision of the at least one second router, based on a local policy of the at least one second router, as to whether load balancing is to be performed based on the threshold value or based on the maximum link bandwidth value of the first router;

wherein the load balancing is to be performed for the class of data packets if a currently available link bandwidth value divided by a maximum link bandwidth value is below the threshold value.

11. A non-transitory computer readable medium storing a computer program product for forwarding load balancing information in a label switched network, the computer program product comprising software instructions which, when run on one or more processing circuits of a second router of the label switched network, causes the second router to:

receive load balancing information comprising a maximum link bandwidth value of the first router and a threshold value, the load balancing information indicating a condition under which load balancing is to be performed for a class of data packets comprising one or more data packets; wherein the load balancing information is received together with label information, being related to the class of data packets, in one message, in order to establish at least a section of a path for label switching the one or more data packets of the class of data packets through the label switched network based on the label information, the load balancing information enabling the second router to determine whether the indicated condition is met;

forward the received load balancing information together with label information in one message, in order to establish at least a further section of the path for label switching the one or more data packets of the class of data packets through the label switched network based on the label information; and responsive to the maximum link bandwidth value of the first router not matching a maximum link bandwidth value of the at least one second router, decide based on a local policy of the at least one second router whether to perform load balancing based on the threshold value or based on the maximum link bandwidth value of the first router;

determine that load balancing is to be performed for the class of data packets if a currently available link bandwidth value divided by a maximum link bandwidth value is below the threshold value.

12. A first router for providing load balancing information in a label switched network, the first router comprising:
processing circuitry;
memory containing instructions executable by the processing circuitry whereby the first router is configured to:
configure load balancing information comprising a maximum link bandwidth value of the first router and a threshold value, the load balancing information indicating a condition under which load balancing is to be performed for a class of data packets comprising one or more data packets;
provide the configured load balancing information together with label information, being related to the class of data packets, in one message to at least one second router of the label switched network, in order to establish at least a section of a path for label switching the one or more data packets of the class of data packets through the label switched network based on the label information; and responsive to the maximum link bandwidth value of the first router not matching a maximum link bandwidth value of the at least one second router, defer to a decision of the at least one second router, based on a local policy of the at least one second router, as to whether load balancing is to be performed based on the threshold value or based on the maximum link bandwidth value of the first router;

wherein the load balancing is to be performed for the class of data packets if a currently available link bandwidth value divided by a maximum link bandwidth value is below the threshold value.

13. The first router of claim 12, wherein the first router is configured as or comprises an egress router of the one or more data packets to be transmitted along the path.

14. A second router for forwarding load balancing information in a label switched network, the second router comprising:
processing circuitry;
memory containing instructions executable by the processing circuitry whereby the second router is configured to:
receive load balancing information comprising a maximum link bandwidth value of the first router and a threshold value, the load balancing information indicating a condition under which load balancing is to be performed for a class of data packets comprising one or more data packets; wherein the load balancing information is received together with label information, being related to the class of data packets, in one message, in order to establish at least a section of a path for label switching the one or more data packets of the class of data packets through the label switched network based on the label information, the load balancing information enabling the second router to determine whether the indicated condition is met;
forward the received load balancing information together with label information in one message, in order to establish at least a further section of a path for label switching the one or more data packets of the class of data packets through the label switched network based on the label information;
responsive to the maximum link bandwidth value of the first router not matching a maximum link bandwidth value of the at least one second router, decide based on a local policy of the at least one second router whether to perform load balancing based on the threshold value or based on the maximum link bandwidth value of the first router; and
determine that load balancing is to be performed for the class of data packets if a currently available link bandwidth value divided by a maximum link bandwidth value is below the threshold value.

15. The second router of claim 14, wherein the second router is configured as or comprises an ingress router for the one or more data packets to be transmitted along the path or an intermediate router between the ingress router and an egress router for the one or more data packets to be transmitted along the path.

16. A system of distributing load balancing information in a label switched network, the system comprising:
a first router comprising:
first processing circuitry;
memory containing instructions executable by the first processing circuitry whereby the first router is configured to:

configure load balancing information comprising a maximum link bandwidth value of the first router and a threshold value, the load balancing information indicating a condition under which load balancing is to be performed for a class of data packets comprising one or more data packets;

provide the configured load balancing information together with label information, being related to the class of data packets, in one message to at least one second router of the label switched network, in order to establish at least a section of a path for label switching the one or more data packets of the class of data packets through the label switched network based on the label information; and responsive to the maximum link bandwidth value of the first router not matching a maximum link bandwidth value of the at least one second router, defer to a decision of the at least one second router, based on a local policy of the at least one second router, as to whether load balancing is to be performed based on the threshold value or based on the maximum link bandwidth value of the first router;

a second router comprising:

second processing circuitry;

memory containing instructions executable by the second processing circuitry whereby the second router is configured to:

receive load balancing information comprising a maximum link bandwidth value of the first router and a threshold value, the load balancing information indicating a condition under which load balancing is to be performed for a class of data packets comprising one or more data packets; wherein the load balancing information is received together with label information, being related to the class of data packets, in one message, in order to establish at least a section of a path for label switching the one or more data packets of the class of data packets through the label switched network based on the label information, the load balancing information enabling the second router to determine whether the indicated condition is met;

forward the received load balancing information together with label information in one message, in order to establish at least a further section of a path for label switching the one or more data packets of the class of data packets through the label switched network based on the label information;

responsive to the maximum link bandwidth value of the first router not matching a maximum link bandwidth value of the at least one second router, decide based on a local policy of the at least one second router whether to perform load balancing based on the threshold value or based on the maximum link bandwidth value of the first router; and determine that load balancing is to be performed for the class of data packets if a currently available link bandwidth value divided by a maximum link bandwidth value is below the threshold value.

* * * * *